(12) United States Patent
Thiruvengadam et al.

(10) Patent No.: US 10,904,174 B1
(45) Date of Patent: Jan. 26, 2021

(54) SCREEN SIZE-BASED PICTORIAL MESSAGE TRANSLATION

(71) Applicant: International Business Machines Corporation, Armonk, NY (US)

(72) Inventors: Sridhar Thiruvengadam, Chennai (IN); Vijay Ekambaram, Chennai (IN); Smitkumar Narotambhai Marvaniya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/502,299

(22) Filed: Jul. 3, 2019

(51) Int. Cl.
*G06F 17/00* (2019.01)
*H04L 12/58* (2006.01)
*G06F 16/51* (2019.01)
*G06F 3/14* (2006.01)
*G06F 40/20* (2020.01)

(52) U.S. Cl.
CPC .............. *H04L 51/046* (2013.01); *G06F 3/14* (2013.01); *G06F 16/51* (2019.01); *G06F 40/20* (2020.01); *H04L 51/10* (2013.01)

(58) Field of Classification Search
CPC . G06F 40/20; G06F 16/51; G06F 3/14; H04L 51/046; H04L 51/10
See application file for complete search history.

(56) References Cited

U.S. PATENT DOCUMENTS

| 7,330,100 | B2 * | 2/2008 | Yu | H04M 1/72544 340/5.61 |
| 7,958,457 | B1 * | 6/2011 | Brandenberg | G06F 1/1664 715/789 |
| 8,213,745 | B2 * | 7/2012 | Kumar | G06T 3/0012 382/276 |

(Continued)

FOREIGN PATENT DOCUMENTS

| EP | 1649427 A1 | 4/2006 |
| EP | 2839389 A1 | 2/2015 |
| WO | 2015/030634 A1 | 3/2015 |

OTHER PUBLICATIONS

Kevin Chen et al., "Text2Shape: Generating Shapes from Natural Language by Learning Joint Embeddings", Mar. 22, 2018, 35 pages.

(Continued)

*Primary Examiner* — Laurie A Ries
(74) *Attorney, Agent, or Firm* — Jay Wahlquist; Hunter E. Webb; Keohane & D'Alessandro, PLLC

(57) ABSTRACT

Aspects of the present invention provide an approach for managing communications. In an embodiment, a set of informational components are extracted from a received textual message received at a user device. Based on these informational components, a group of pictorial representations is generated. Each pictorial representation that is generated corresponds to one of a plurality of the informational components of the textual message. The pictorial representations are assembled into a number of potential pictorial message representations that each represent the (Continued)

content of the textual message. An information loss is calculated for each of the potential pictorial message representation. A pictorial message is selected from the set based on the information loss and available display space of the user device and is displayed on the user device.

20 Claims, 9 Drawing Sheets

(56) References Cited

U.S. PATENT DOCUMENTS

| | | | | |
|---|---|---|---|---|
| 8,327,292 | B2* | 12/2012 | Greer | G06F 16/81 |
| | | | | 715/810 |
| 9,766,784 | B2* | 9/2017 | Pascal | G06Q 10/107 |
| 9,824,479 | B2* | 11/2017 | Bekmambetov | G06F 40/186 |
| 2007/0101281 | A1* | 5/2007 | Simpson | G06F 40/166 |
| | | | | 715/764 |
| 2008/0216022 | A1* | 9/2008 | Lorch | H04M 1/72555 |
| | | | | 715/847 |
| 2010/0198584 | A1* | 8/2010 | Habu | G06F 40/20 |
| | | | | 704/9 |
| 2011/0078564 | A1* | 3/2011 | Almodovar Herriz | |
| | | | | G06F 16/58 |
| | | | | 715/262 |
| 2012/0246027 | A1* | 9/2012 | Martin | G02B 27/0172 |
| | | | | 705/26.63 |
| 2014/0115483 | A1* | 4/2014 | Wetherell | G06F 16/35 |
| | | | | 715/738 |
| 2014/0161356 | A1* | 6/2014 | Tesch | G06K 9/00 |
| | | | | 382/196 |
| 2015/0074504 | A1* | 3/2015 | Steinfl | G06F 3/04886 |
| | | | | 715/202 |
| 2016/0110900 | A1* | 4/2016 | Moosa | G06T 11/203 |
| | | | | 345/467 |
| 2017/0085507 | A1* | 3/2017 | Abou Mahmoud | H04L 51/10 |
| 2018/0260385 | A1* | 9/2018 | Fan | G06F 40/274 |
| 2019/0188258 | A1* | 6/2019 | Bax | G06F 40/58 |
| 2019/0259111 | A1* | 8/2019 | Reed | G06Q 30/0641 |
| 2019/0295537 | A1* | 9/2019 | Sapugay | G06N 20/00 |

OTHER PUBLICATIONS

Renate E. Meyer et al., "The Role of Verbal and Visual Text in the Process of Institutionalization", Dec. 2018, 65 pages.
Gonzalo Sanchez, "How to Transform Text Into Compelling Images That Tell a Story", Copyright 2019 Piktochart, 16 pages.
Ali Farhadi et al., "Every Picture Tells a Story: Generating Sentences from Images", ECCV 2010, 14 pages.
"Text-to-Picture Synthesis Project", Copyright 2002-2007, The Board of Regents of the University of Wisconsin System, 6 pages.
Leen Sevens et al., Demo page, "Text2Picto and Picto2Text", Printed Mar. 19, 2019, 1 page.

* cited by examiner

US 10,904,174 B1

SCREEN SIZE-BASED PICTORIAL MESSAGE TRANSLATION

TECHNICAL FIELD

This invention relates generally to message processing systems and, more specifically, to generating a pictorial message translation that conveys the highest level of content for the available space.

BACKGROUND

The advent of social networking, instant messaging, and ubiquitous wireless data networks allows individuals to select from a plurality of methods to receive communications from their contacts. In the past, communications between individuals were limited to physical mail, wired telephones, fax, and wireless telephones. However, with the expansion of the Internet, coupled with mobile devices capable of maintaining a data connection to the Internet, users may be able to select from a plethora of communications means, such as: cellular phone calls, email to multiple accounts, multiple instant messaging protocols, twitter messages, video chats, Short Messaging Service (SMS) and Multimedia Messaging Service (MMS) messages, social networking messages, voicemail, and the like. Typically, users are less concerned by the actual communication mode used with their contacts and more concerned with the content of the communication conveyed. These users generally want to be able to receive communications that they can decipher, regardless of the screen size of the device on which the communications are received.

SUMMARY

In general, aspects of the present invention provide an approach for managing communications. In an embodiment, a set of informational components are extracted from a received textual message received at a user device. Based on these informational components, a group of pictorial representations is generated. Each pictorial representation that is generated corresponds to one of a plurality of the informational components of the textual message. The pictorial representations are assembled into a number of potential pictorial message representations that each represents the content of the textual message. An information loss is calculated for each of the potential pictorial message representation. A pictorial message is selected from the set based on the information loss and available display space of the user device and is displayed on the user device.

One aspect of the present invention includes a computer-implemented method for managing communications, the method comprising: extracting a set of informational components from a received textual message received at a user device; generating a group of pictorial representations based on the informational components, each pictorial representation of the group of pictorial representations corresponding to at least one informational component of the set of informational components; assembling a set of potential pictorial message representations, each potential pictorial message representation representing the textual message with a set of pictorial representations from the group of pictorial representations; calculating an information loss for each potential pictorial message representation of the set of potential pictorial message representations; and displaying on a user device a pictorial message representation selected from the set of potential pictorial message representations based on the information loss and an available display space of the user device.

Another aspect of the present invention includes a computer program product embodied in a computer readable medium that, when executed by a computer device, performs a method for managing communications, the method comprising: extracting a set of informational components from a received textual message received at a user device; generating a group of pictorial representations based on the informational components, each pictorial representation of the group of pictorial representations corresponding to at least one informational component of the set of informational components; assembling a set of potential pictorial message representations, each potential pictorial message representation representing the textual message with a set of pictorial representations from the group of pictorial representations; calculating an information loss for each potential pictorial message representation of the set of potential pictorial message representations; and displaying on a user device a pictorial message representation selected from the set of potential pictorial message representations based on the information loss and an available display space of the user device.

Yet another aspect of the present invention includes a computer system for managing communications, the computer system comprising: a memory medium comprising program instructions; a bus coupled to the memory medium; and a processor for executing the program instructions, the instructions causing the system to: extract a set of informational components from a received textual message received at a user device; generate a group of pictorial representations based on the informational components, each pictorial representation of the group of pictorial representations corresponding to at least one informational component of the set of informational components; assemble a set of potential pictorial message representations, each potential pictorial message representation representing the textual message with a set of pictorial representations from the group of pictorial representations; calculate an information loss for each potential pictorial message representation of the set of potential pictorial message representations; and display on a user device a pictorial message representation selected from the set of potential pictorial message representations based on the information loss and an available display space of the user device.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
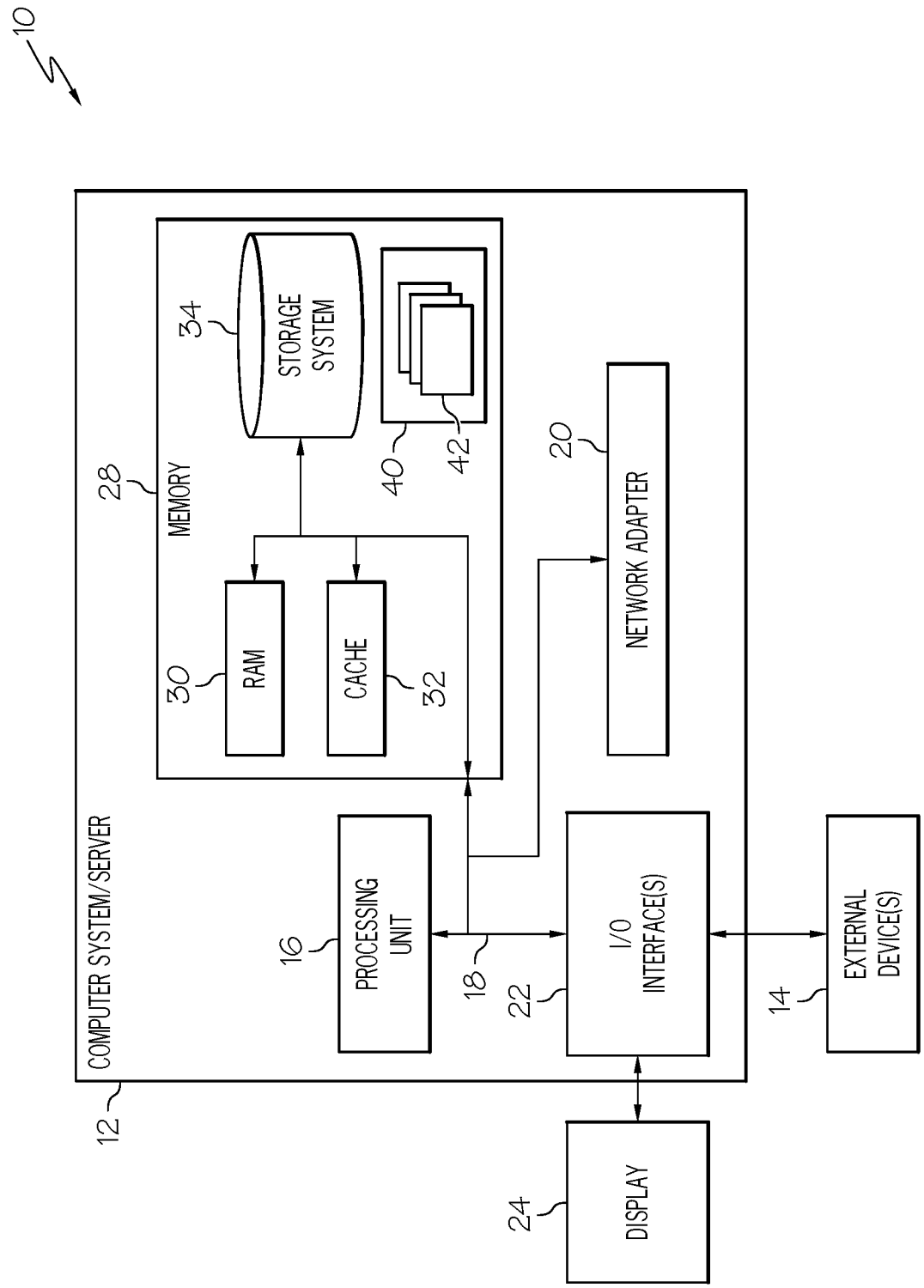
FIG. 1 depicts a data processing system according to an embodiment of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, aspects of the present invention provide an approach for managing communications. In an embodiment, a set of informational components are extracted from a received textual message received at a user device. Based on these informational components, a group of pictorial representations is generated. Each pictorial representation that is generated corresponds to one of a plurality of the informational components of the textual message. The pictorial representations are assembled into a number of potential pictorial message representations that each represent the content of the textual message. An information loss is calculated for each of the potential pictorial message representation. A pictorial message is selected from the set based on the information loss and available display space of the user device and is displayed on the user device.

Referring now to FIG. 1, a computerized implementation 10 of an embodiment for managing an incoming communication by determining a criticality level of the incoming communication and providing a prompt to a user based on the criticality level will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for managing an incoming communication by determining a criticality level of the incoming communication and providing a prompt to a user based on the criticality level. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for managing an incoming communication by generating a pictorial message representation based on available display space, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
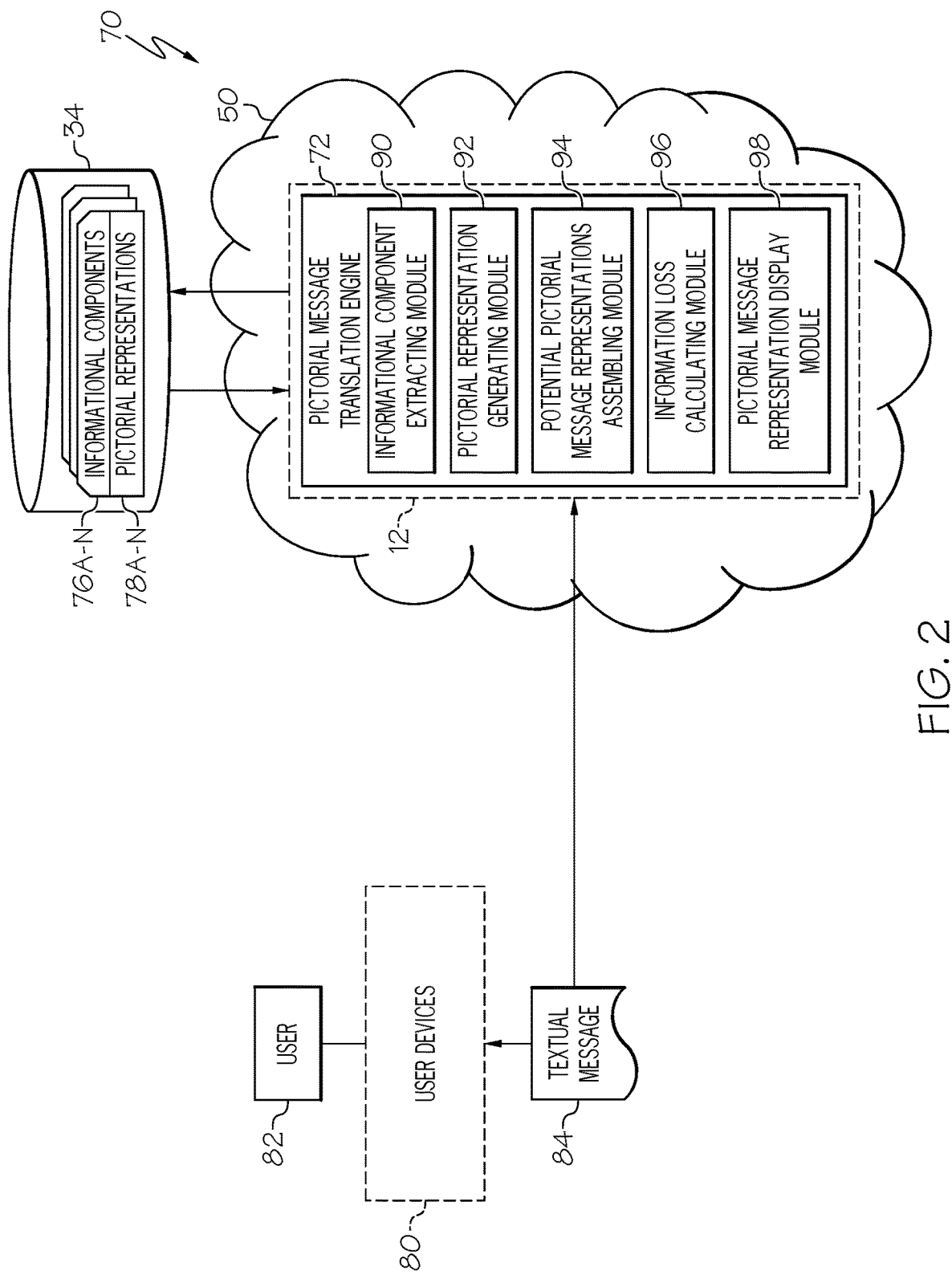
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each user device 80 need not have a pictorial message translation engine (hereinafter "system 72"). Rather, system 72 could be loaded on a server or server-capable device that communicates (e.g., wirelessly) with equipped user 82 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or displays a textual message 84 for a user 82 on a user device 80. Such other system(s) have not been shown in FIG. 2 for brevity purposes.

Along these lines, system 72 may perform multiple functions similar to a general-purpose computer. Specifically, among other functions, system 72 can manage incoming textual message 84 communications to a user device 80 of a user 82. To accomplish this, system 72 can include: an informational component extracting module 90, a pictorial representation generating module 92, a potential pictorial message representations assembling module 94, an information loss calculating module 96, and a pictorial message representation display module 98.

Figure 3:
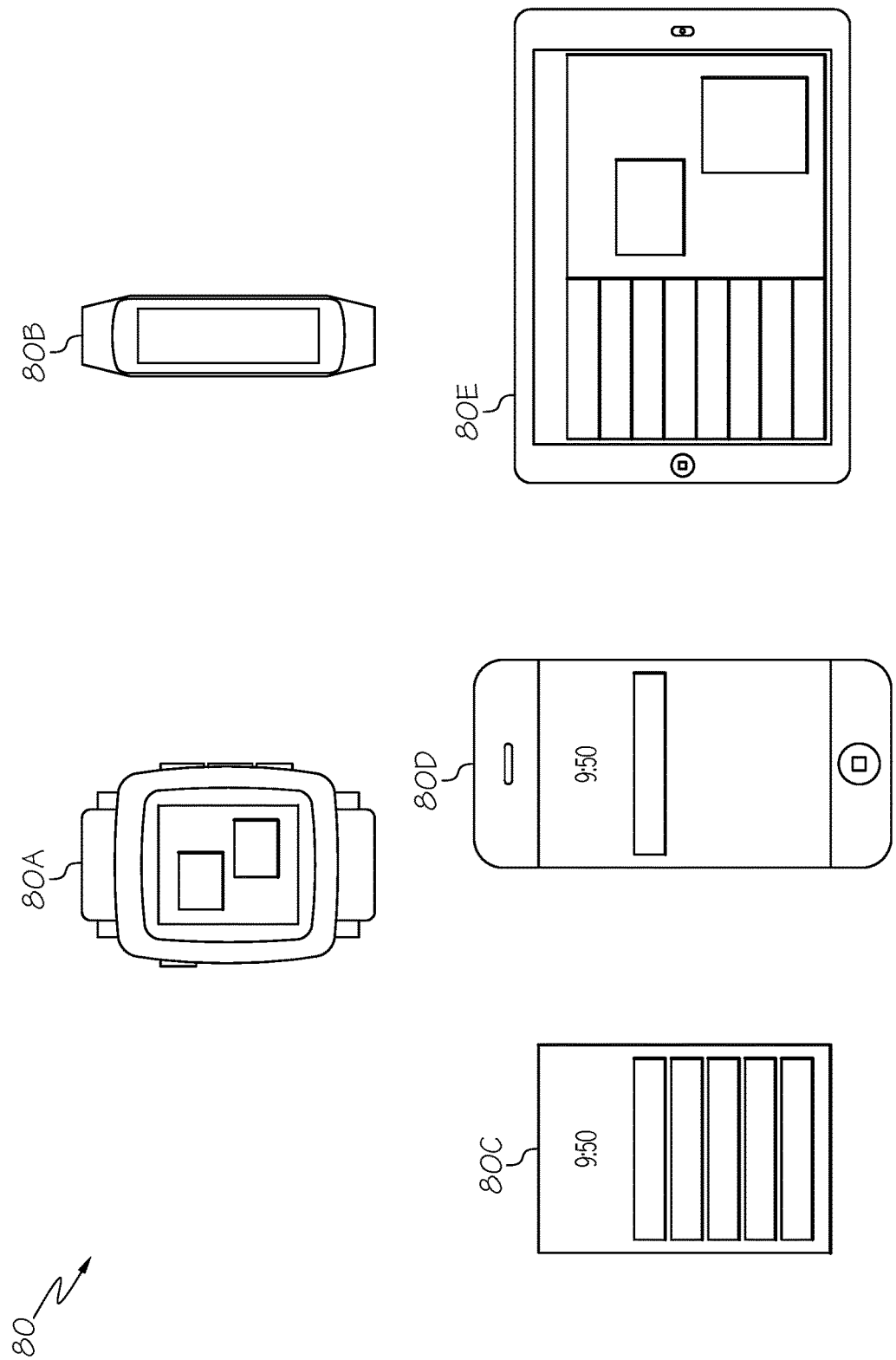
FIG. 3 depicts an example set of user devices according to an embodiment of the present invention.

Referring now to FIG. 3, an example set of user devices 80 are depicted according to an embodiment of the present invention. In example embodiments, user device 80 may include, but is not limited to, a smart watch 80A, a wearable device 80B, a smart phone 80C-D, a cellular phone (not shown), a Voice over Internet Protocol (VoIP) phone (not shown), a personal data assistant (PDA) (not shown), a personal entertainment device (not shown), a tablet 80E, or any other communication device capable of receiving a textual message 84 over network 50. Referring additionally to FIG. 2, user device 80 may be enabled to communicate over network 50 using any of numerous different access mechanisms. For example, mobile access mechanisms such as Wideband Code Division Multiple Access (W-CDMA), CDMA2000, Global System for Mobile communications (GSM), General Packet Radio Service (GPRS), and/or the like, may be supported as well as wireless access mechanisms such as WLAN, WiMAX, and/or the like, and fixed access mechanisms such as Digital Subscriber Line (DSL), cable modems, Ethernet, and/or the like. In any case, as shown, user device 80 can have a display area for displaying an incoming textual message 84.

The inventors of the invention described herein have discovered deficiencies in the current solutions for managing incoming communications for display on a user device. For example, in many cases, the screen sizes of different user devices 80 do not have display areas that are large enough to display the entire textual content of a textual message 84, much less having the ability to display the entire textual content of a plurality of incoming textual messages 84. Current solutions for displaying textual messages 84 on a user device 80 may involve adapting the content properties such as text size, format, etc., based on display device type for rendering the content. However, by decreasing the size of the text, these solutions may make the user's 82 ability to decipher the information even more difficult, and not less. Further, these solutions typically treat all messages in the same way and, as such, fail to take into account how critical a message or a portion of a message may be.

The current embodiments solve these and/or other problems in the current solutions by converting textual information in a textual message 84 into a pictorial form based on user defined display area/size, run-time configurations, etc. The semantic information of the content can thereby be captured and represented in a symbolic manner such that information gain is high. This symbolic representation allows the information in the notification text to be rendered to the user 82 using different numbers and/or combinations of pictorial representations, such that the content of the message can be conveyed on user devices 80 having vastly different display sizes. Moreover, these symbolic representations can be configured and/or re-configured at run-time to maximize the rendering space of the notification based on criticality of the messages and recipient profile.

Referring again to FIG. 2, informational component extracting module 90 of system 72, as executed by computer system/server 12, is configured to extract a set of informational components 76A-N (singularly 76N) from a received textual message 84 received at user device 80 of user 82. Textual message 84 can be received via one or more of a number of communications solutions and can be in a number of formats including, but not limited to: a short message service (SMS) message (e.g., text message); an instant message (e.g., chat message); a social media message (e.g., via Twitter, Facebook, and/or the like); an email message; a voice call, a video call, a voice message, a video message, a multimedia messaging service (MMS) message (e.g., video message), and/or the like, which has been converted to text using voice to text capabilities; a push message from a mobile application; and or the like. To this extent, textual message 84 can be a message sent from one or more third party senders.

In any case, informational components 76A-N that are extracted from textual message 84 by informational component extracting module 90 are words or phrases that define one or more terms in textual message 84 at different levels of abstraction. For example, assume that textual message 84 is a message from Spouse that includes "When you come home from office can you please get vegetables like 1 lb potato half lb carrot and fruit from supermarket. Dmart is on the way may be you can get it from there?" From "half lb Carrot, 1 lb potato, and fruit," informational component extracting module 90 might extract the informational components 76A-N: "carrots", "potatoes", and "fruit"; "fruit" and "vegetables"; and "produce", among others.

Figure 4:
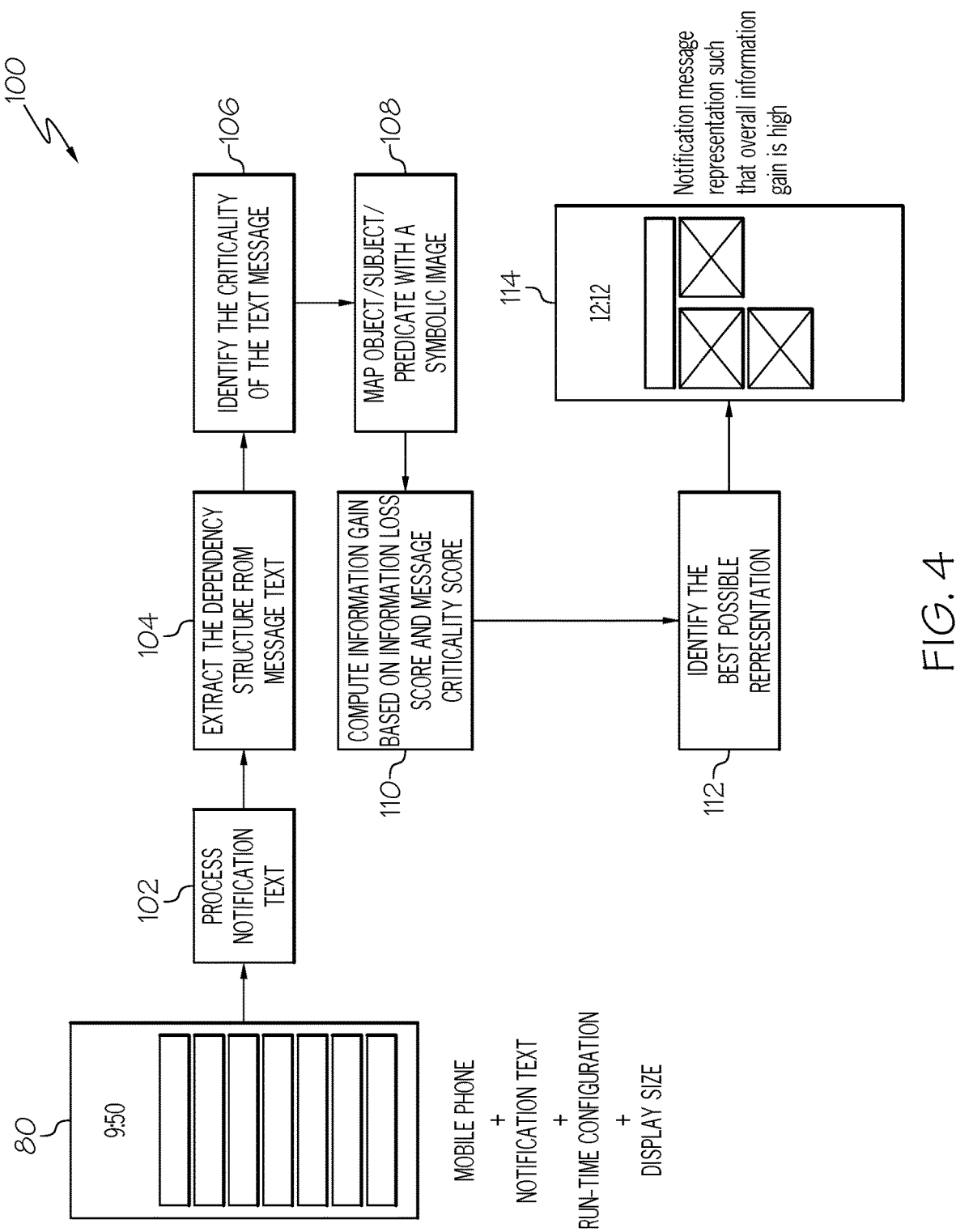
FIG. 4 depicts an example data flow diagram according to an embodiment of the present invention.

Referring now to FIG. 4, an example data flow diagram 100 is depicted. Referring additionally to FIG. 2, to generate these informational components 76A-N, informational component extracting module 90 can Process Notification Text 102 of textual message 84 received by user device 80 to Extract the Dependency Structure from the Message Text 104. The extraction can begin by extracting a set of entities in the received textual message 84. Entities can include objects, people, places, actions, etc., that are included within textual message 84. Once the entities have been extracted, a set of relationships between different entities of the set of entities that have been extracted can be determined. Text summarization can then be applied to the set of entities and the set of relationships to extract different possible textual representations making up the set of informational components 76A-N. To accomplish this, important phrases can be identified in the notification text. In addition, a slang dictionary can be used to handle texting acronym shortcuts commonly used for chatting. Multi-language functionality can be enabled using dependency parsing models which are trained on separate language. This can enable the identification of important phrases, which could be different between different languages (e.g., between the English language and the Japanese language).

Informational component extracting module 90 can also use the entity, relationship and/or resulting informational component information elements to Identify the Criticality of the Text Message 106. This can be accomplished by performing a textual analysis on each element to distinguish non-critical elements from critical elements. For example, words and phrases that convey greetings and/or pleasantries, such as "hello", "hi there", "how are you", "what's up?", etc., may be determined to be non-critical, while other words and phrases that convey an emergency or other indication of severity may be determined to be highly critical. These elements can be assigned rankings/weightings (e.g., 0 through 1 with 1 being the most critical) and/or the message as a whole can be assigned a ranking/weighting based on the elements contained therein. In addition, criticality of a message can be determined or influenced based on information contained in a user profile associated with the user 82. For example, the profile may indicate that the criticality of a message may be set or influenced based on the sender of the message. For example, a message from the owner of the company in which the user 82 works can be assigned a higher criticality than one from a college friend. Additionally or in the alternative, the content and or sender information may be compared to a message history. To accomplish this, a classifier can be trained for predicting the message criticality based on the criticality of past messages and information in the user profile. In an embodiment, these functions and/or any other function of system 72 can be performed by a cognitive system, such as, but not limited to, IBM's Watson Search or Watson Explorer (IBM is a registered trademark and Watson is a trademark of International Business Machines Corporation).

Pictorial representation generating module 92 of system 72, as executed by computer system/server 12, is configured to generate a group of pictorial representations 78A-N (singularly 78N) based on the informational components 76A-N. Each pictorial representation of the group of pictorial representations generated by pictorial representation generating module 92 corresponds to at least one informational component 76N of the set of informational components 76A-N. In order to accomplish this, pictorial representation generating module 92 can Map Object/Subject/Predicate with a Symbolic Image 108. In an embodiment, a library of pictorial representations 78A-N can be stored (e.g., on datastore 34) along with associated informational component 76A-N. Pictorial representation generating module 92 can then perform a semantic visual search on each informational component 76N extracted by informational component extracting module 90 in datastore 34 to retrieve pictorial representation 78N or representations 78A-N associated therewith. While searching for a particular pictorial representation 76N, pictorial representation generating module 92 can also consider some of the region constraints, which can help in picking the realistic images that would be most familiar to and convey the most accurate information to user 82.

Potential pictorial message representations assembling module 94 of system 72, as executed on computer system/server 12, is configured to assemble a set of potential pictorial message representations for textual message 84. Each and every potential pictorial message representation assembled by potential pictorial messages representations assembling module 94 represents the textual message 84 with a set of pictorial representations 78A-N from the group of pictorial representations 78A-N. To this extent, the goal of potential pictorial message representations assembling module 94 is to identify all of the possible ways of combining pictorial representations 78A-N into message representations that convey the content of the original textual message 84.

Figure 5:
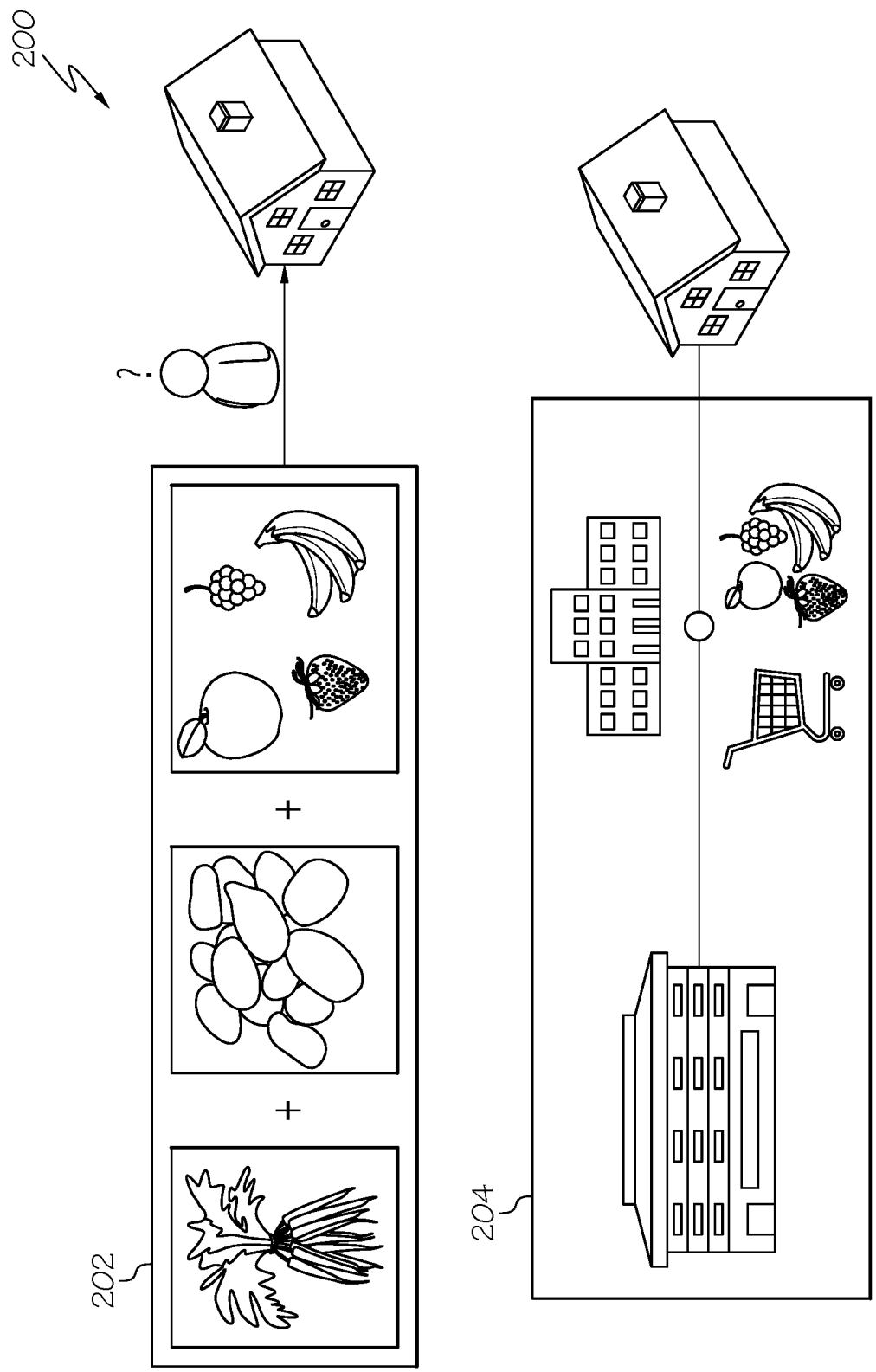
FIG. 5 depicts an example set of potential pictorial message representations according to illustrative embodiments.

Referring now to FIG. 5, an example set of potential pictorial message representations 200 is depicted according to an illustrative embodiment. Assume again that the textual message 84 includes "When you come home from office can you please get vegetables like 1 lb potato half lb carrot and fruit from supermarket. Dmart is on the way may be you can get it from there?" As shown, set of potential pictorial message representations 200 includes a first potential pictorial message 202 and a second potential pictorial message, each of which convey information from the textual message with varying levels of granularity. Note that first potential pictorial message 202 conveys more detail about the items that need to be purchased while second pictorial message 204 conveys more detail about when and where the items should be purchased. Also note that first potential pictorial message 202 takes up more horizontal space but less vertical space than second potential pictorial message 204.

Figure 6:
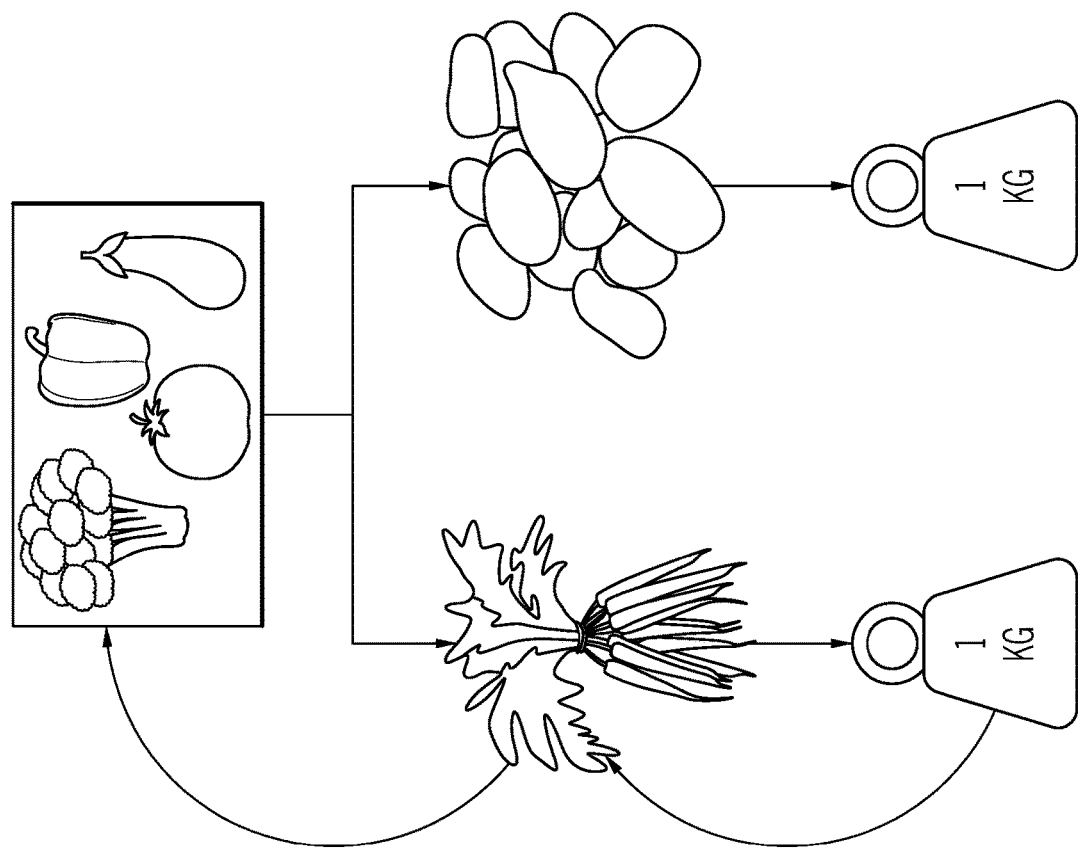
FIG. 6 depicts an example potential pictorial message representation tree structure according to illustrative embodiments.

Referring now to FIG. 6, a potential pictorial message representation tree structure 300 is depicted according to an illustrative embodiment. Tree structure 300 can be constructed by potential pictorial message representations assembling module 94 as part of the assembling of potential pictorial message representations. Tree structure 300 can enable structured storage of and subsequent construction of potential pictorial message representations when needed. As shown, tree structure 300 represents the information "1 lb potato half lb carrot". As shown, the information in tree structure 300 is conveyed with a decreasing level of detail as the tree goes from bottom to top, since it discards and combines the information as it does so. It should be understood that multiple trees could be used to represent a single textual message 84 if the content cannot be represented in a single tree.

Referring again to FIG. 2 in combination with FIGS. 4 and 5, information loss calculating module 96 of system 72, as executed on computer system/server 12, is configured to calculate an information loss for each potential pictorial message representation 78N of the set of potential pictorial message representations 78A-N. To accomplish this, information loss calculating module 96 can assign an information loss factor to each pictorial representation 78N (e.g., as situated within potential pictorial message representation tree structure 300). Each information loss factor can be a numerical factor (e.g., a percentage or the like) that indicates how completely a pictorial representation 78N conveys the meaning of the informational component 76A or components 76A-N that it represents. The information loss factors for all pictorial representations 78A-N in a potential pictorial message representation can then be aggregated to get the information loss for the entire potential pictorial message representation. This aggregation can further include applying the criticality weighting factor, which was previously assigned to each informational component 76N, to the information loss factor of the corresponding pictorial representation 78N. In addition, the information loss of the textual message 84 as a whole can be modified by applying the criticality weighting factor for the textual message 84 to the information loss of the textual message 84 as a whole. When potential pictorial message representation tree structure 300 representation is utilized, the aggregation can be performed using the equation:

$$\text{Information Loss(Text Message, Root)} = \sum_{i=1}^{n} \text{InformationLoss}(Child_i).$$

Pictorial message representation display module 98 of system 72, as executed on computer system/server 12, is configured to display on a user device 80 a pictorial message representation 114 selected from the set of potential pictorial message representations. This selection is made based on the information loss and an available display space of the user device such that the amount of information conveyed is optimized for the available display space. To do so, pictorial message representation display module 98 can Compute Information Gain based on Information Loss score and Message Criticality Score 110. Then pictorial message representation display module 98 can Identify the Best Possible Representation 112 to select the pictorial message representation. Pictorial message representation display module 98 can then evaluate the information loss score for the selected pictorial message limitation against a maximum information loss threshold. If the information loss for the selected pictorial message exceeds the threshold, pictorial message representation display module 98 can select another potential pictorial message representation or, if no potential pictorial message representation has an information loss that does not exceed the threshold, can revert to a partial-text or text-only display.

Pictorial message representation display module 98 can further take other messages displayed on user device 80 into account when selecting pictorial message representation. To accomplish this, a plurality of possible ways of pictorially representing the new textual message 84 are identified, and the information loss, message criticality score, and possible display size is computed for each of the representations, as detailed above. The same identification and computation can also be performed for all currently displayed pictorial representations. The message criticality of the new message is compared with message criticalities corresponding to other messages to be displayed on the user device. Based on these factors, the best representation is identified such that overall information loss is minimized but message criticality score and information gain is maximized. This identifying of the best representation can involve assigning available display space to the new pictorial message representation based on a total message space of the user device and the comparing of the message criticality with message criticalities corresponding to other messages. The overall information gain of all displayed messages is then calculated based on information loss factors and criticality scores for the displayed messages. This overall information gain is compared to a predetermined threshold. If it is determined the overall information gain does not exceed the predetermined threshold, then the pictorial message representation of at least one of the displayed messages can be restructured to meet the threshold.

In an embodiment, to identify the best representation, the information loss for each of displayed pictorial message representation can be computed. Additionally, the notification criticality score for each of the notification text can be computed. Based on these computations, the overall information gain, which combines the information loss and notification criticality score, for all displayed pictorial message representation can be computed based on display size. This overall information gain can be computed using two-pass quadratic programming by following these constraints:

$$\text{Overall Information Gain} = \sum_{i=1}^{n} IG(NT_i^{text}, D(NT_i^{height}), D(NT_i^{width}))$$

s. t. $D(NT_1^{height}) + D(NT_2^{height}) + \ldots + D(NT_m^{height}) = \text{Height}$ $D(NT_1^{width}) + D(NT_2^{width}) + \ldots + D(NT_m^{width}) = \text{Width}$ where:

$D(NT_i^{width}) \rightarrow$ represents the width of the $i^{th}$ notification text representation.

$D(NT_i^{height}) \rightarrow$ represents the height of the $i^{th}$ notification text representation.

$NT_i^{text} \rightarrow$ the $i^{th}$ notification text representation $IG(NT_i^{text}, DisplaySize_i) \rightarrow$ gives the information gain for $i^{th}$ notification text representation for the given display size.

n → number of notification messages (text)

The Information gain for the notification text is then computed as:

$$IG(NText, Dsize) = f_{score}^{InformationLoss}(NText, DSize) + f_{score}^{criticality}(NText, DSize)$$

Based on the results, the pictorial message representations can be displayed to achieve the best combination for content rendering such that overall information gain is high.

Figure 7A:
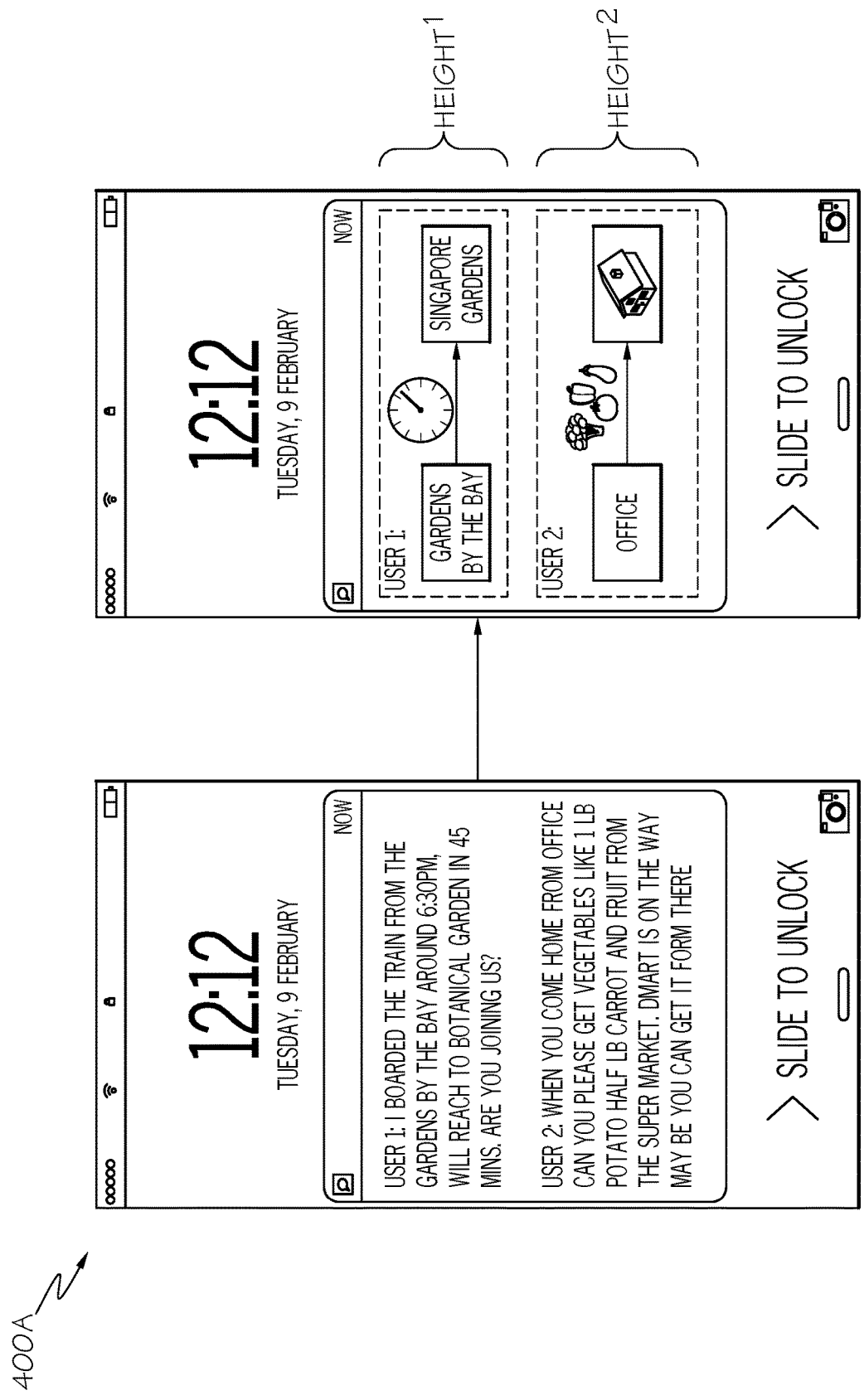
FIG. 7A-B depict example pictorial representations according to illustrative embodiments.
Figure 7B:
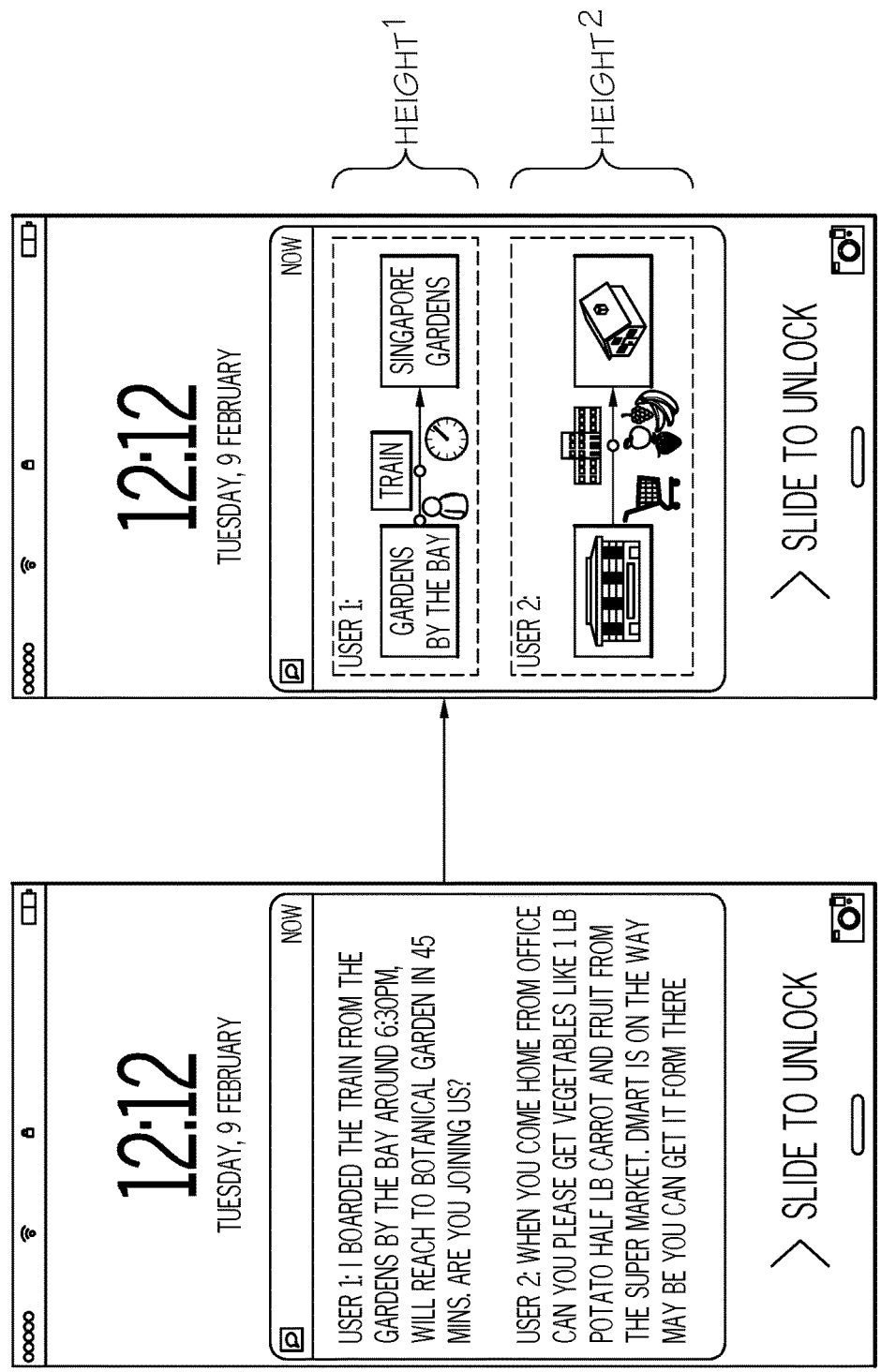

Referring now to FIGS. 7A-B, a number of example pictorial representation displays 400A-B are shown according to illustrative embodiments. As shown, representation display 400A has been optimized for a more limited display area and, as such, the pictorial message representations convey information with a respectively greater information loss. Conversely, representation display 400B has been optimized for a larger display area and, as such, the pictorial message representations convey information with a respectively less information loss. In an embodiment, user 82 can interact with (e.g., tap) a pictorial representation 78N (FIG. 2) within a pictorial message representation to reveal an expanded group of pictorial representations 78A-N that further define the pictorial representation 78N. In an embodiment, this expanded group of pictorial representations 78A-N can be generated using tree structure 300 (FIG. 6). Additionally or in the alternative, user 82 can interact with (e.g., long touch) a pictorial representation 78N (FIG. 2) within a pictorial message representation to reveal the underlying text corresponding to the pictorial representation 78N or corresponding to the entire textual message 84.

Figure 8:
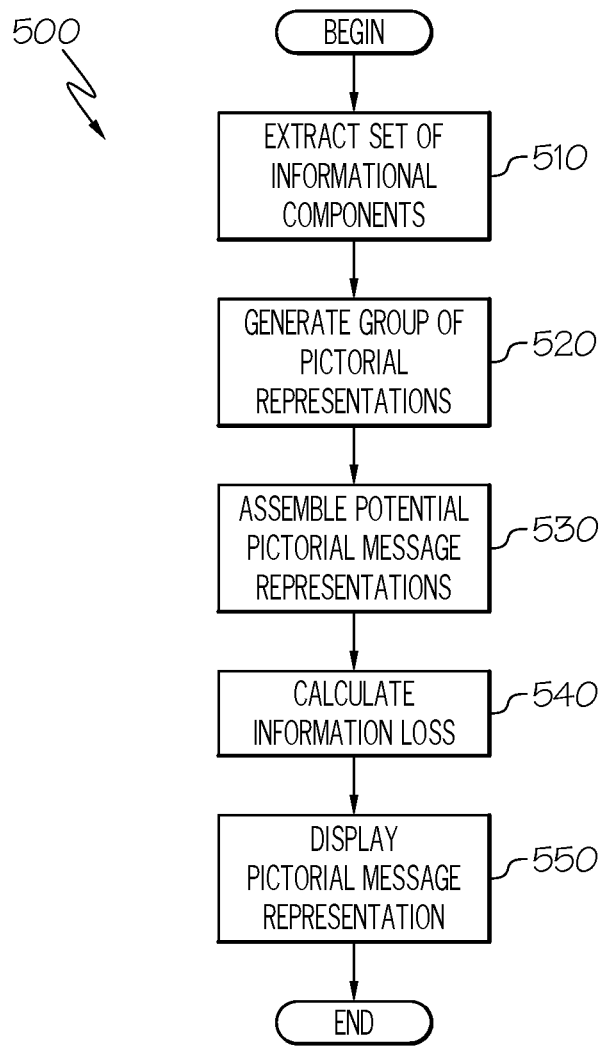
FIG. 8 depicts an example process flowchart according to an embodiment of the present invention.

Referring now to FIG. 8 in conjunction with FIG. 2, a process flowchart 500 according to an embodiment of the present invention is shown. At 510, informational component extracting module 90 of system 72, as executed by computer system/server 12, extracts a set of informational components 76A-N from a received textual message 84 received at a user device 80. At 520, pictorial representation generating module 92 of system 72, as executed by computer system/server 12, generates a group of pictorial representations 78A-N based on the informational components 76A-N. Each pictorial representation 78N of the group of generated pictorial representations 78A-N correspond to at least one informational component 76N of the set of informational components 76A-N. At 530, potential pictorial message representations assembling module 94 of system 72, as executed by computer system/server 12, assembling a set of potential pictorial message representations. Each assembled potential pictorial message representation represents the textual message with a set of pictorial representations 78A-N from the group of pictorial representations 78A-N. At 540, information loss calculating module 96 of system 72, as executed by computer system/server 12, calculates an information loss for each potential pictorial message representation of the set of potential pictorial message representations. Finally, at 550, pictorial message representation display module 98 of system 72, as executed by computer system/server 12, displays on user device 80 a pictorial message representation selected from the set of potential pictorial message representations based on the information loss and an available display space of the user device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for managing communications. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for managing communications. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches for managing communications. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for managing communications, the method comprising:

extracting a set of informational components from a received textual message received at a user device;

generating a group of pictorial representations based on the informational components, each pictorial representation of the group of pictorial representations corresponding to at least one informational component of the set of informational components;

assembling a set of potential pictorial message representations, each potential pictorial message representation representing the textual message with a set of pictorial representations from the group of pictorial representations;

calculating an information loss for each potential pictorial message representation of the set of potential pictorial message representations based on an aggregation of information loss factors corresponding to all pictorial representations in the potential pictorial message representation; and displaying on a user device a pictorial message representation selected from the set of potential pictorial message representations based on the information loss and an available display space of the user device.

2. The computer-implemented method of claim 1, the extracting further comprising:

extracting a set of entities in the received textual message;

determining a set of relationships between different entities of the set of entities;

applying text summarization to the set of entities and the set of relationships to extract different possible textual representations making up the set of informational components.

3. The computer-implemented method of claim 2, the assembling further comprising constructing a tree structure, the tree structure having pictorial representations corresponding to textual representations with a greater degree of summarization in relatively lower level nodes and pictorial representations corresponding to more detailed textual representations in higher level nodes.

4. The computer-implemented method of claim 1, further comprising assigning a message criticality to the textual message based on an informational content of the informational components and a previous communication history of the user.

5. The computer-implemented method of claim 4, the calculating of the information loss for each potential pictorial message representation further comprising:
- assigning an information loss factor to each pictorial representation based on how completely the pictorial representation conveys a meaning of the at least one informational component that corresponds to the pictorial representation; and
- aggregating the information loss factors corresponding to all pictorial representations in the potential pictorial message representation to get the information loss for the potential pictorial message representation.

6. The computer-implemented method of claim 5, the calculating of the information loss for each potential pictorial message representation further comprising applying a weighting factor to the information loss factor corresponding to each pictorial representation based on a determined criticality of the at least one informational component corresponding to the pictorial representation.

7. The computer-implemented method of claim 1, the displaying further comprising:
- comparing the message criticality with message criticalities corresponding to other messages to be displayed on the user device;
- assigning the available display space to the pictorial message representation based on a total message space of the user device and the comparing of the message criticality with message criticalities corresponding to other messages;
- calculating an overall information gain of all displayed messages based on information loss factors and criticality scores for the displayed messages; and
- restructuring, in response to a determination that the overall information gain does not exceed a predetermined threshold, a pictorial message representation of at least of the displayed messages.

8. A computer program product embodied in a computer readable medium that, when executed by a computer device, performs a method for managing communications, the method comprising:
- extracting a set of informational components from a received textual message received at a user device;
- generating a group of pictorial representations based on the informational components, each pictorial representation of the group of pictorial representations corresponding to at least one informational component of the set of informational components;
- assembling a set of potential pictorial message representations, each potential pictorial message representation representing the textual message with a set of pictorial representations from the group of pictorial representations;
- calculating an information loss for each potential pictorial message representation of the set of potential pictorial message representations based on an aggregation of information loss factors corresponding to all pictorial representations in the potential pictorial message representation; and
- displaying on a user device a pictorial message representation selected from the set of potential pictorial message representations based on the information loss and an available display space of the user device.

9. The computer program product of claim 8, the extracting further comprising:
- extracting a set of entities in the received textual message;
- determining a set of relationships between different entities of the set of entities;
- applying text summarization to the set of entities and the set of relationships to extract different possible textual representations making up the set of informational components.

10. The computer program product of claim 9, the assembling further comprising constructing a tree structure, the tree structure having pictorial representations corresponding to textual representations with a greater degree of summarization in relatively lower level nodes and pictorial representations corresponding to more detailed textual representations in higher level nodes.

11. The computer program product of claim 8, further comprising assigning a message criticality to the textual message based on an informational content of the informational components and a previous communication history of the user.

12. The computer program product claim 11, the calculating of the information loss for each potential pictorial message representation further comprising:
- assigning an information loss factor to each pictorial representation based on how completely the pictorial representation conveys a meaning of the at least one informational component that corresponds to the pictorial representation; and
- aggregating the information loss factors corresponding to all pictorial representations in the potential pictorial message representation to get the information loss for the potential pictorial message representation.

13. The computer program product of claim 12, the calculating of the information loss for each potential pictorial message representation further comprising applying a weighting factor to the information loss factor corresponding to each pictorial representation based on a determined criticality of the at least one informational component corresponding to the pictorial representation.

14. The computer program product of claim 8, the displaying further comprising:
- comparing the message criticality with message criticalities corresponding to other messages to be displayed on the user device;
- assigning the available display space to the pictorial message representation based on a total message space of the user device and the comparing of the message criticality with message criticalities corresponding to other messages;
- calculating an overall information gain of all displayed messages based on information loss factors and criticality scores for the displayed messages; and
- restructuring, in response to a determination that the overall information gain does not exceed a predetermined threshold, a pictorial message representation of at least of the displayed messages.

15. A computer system for managing communications, the computer system comprising:
- a memory medium comprising program instructions;
- a bus coupled to the memory medium; and
- a processor for executing the program instructions, the instructions causing the system to:
  - extract a set of informational components from a received textual message received at a user device;
  - generate a group of pictorial representations based on the informational components, each pictorial representation of the group of pictorial representations corresponding to at least one informational component of the set of informational components;
  - assemble a set of potential pictorial message representations, each potential pictorial message representation representing the textual message with a set of pictorial representations from the group of pictorial representations;

calculate an information loss for each potential pictorial message representation of the set of potential pictorial message representations based on an aggregation of information loss factors corresponding to all pictorial representations in the potential pictorial message representation; and display on a user device a pictorial message representation selected from the set of potential pictorial message representations based on the information loss and an available display space of the user device.

16. The computer system of claim 15, the instructions causing the system to extract further causing the system to:
    extract a set of entities in the received textual message;
    determine a set of relationships between different entities of the set of entities;
    apply text summarization to the set of entities and the set of relationships to extract different possible textual representations making up the set of informational components.

17. The computer system of claim 16, the instructions causing the system to assemble further causing the system to construct a tree structure, the tree structure having pictorial representations corresponding to textual representations with a greater degree of summarization in relatively lower level nodes and pictorial representations corresponding to more detailed textual representations in higher level nodes.

18. The computer system of claim 15, the instructions further causing the system to assign a message criticality to the textual message based on an informational content of the informational components and a previous communication history of the user.

19. The computer system of claim 15, the instructions causing the system to assemble further causing the system to:
    assign an information loss factor to each pictorial representation based on how completely the pictorial representation conveys a meaning of the at least one informational component that corresponds to the pictorial representation;
    apply a weighting factor to the information loss factor corresponding to each pictorial representation based on a determined criticality of the at least one informational component corresponding to the pictorial representation; and
    aggregate the information loss factors corresponding to all pictorial representations in the potential pictorial message representation to get the information loss for the potential pictorial message representation.

20. The computer system of claim 15, the instructions causing the system to display further causing the system to:
    compare the message criticality with message criticalities corresponding to other messages to be displayed on the user device;
    assign the available display space to the pictorial message representation based on a total message space of the user device and the comparing of the message criticality with message criticalities corresponding to other messages;
    calculate an overall information gain of all displayed messages based on information loss factors and criticality scores for the displayed messages; and
    restructure, in response to a determination that the overall information gain does not exceed a predetermined threshold, a pictorial message representation of at least of the displayed messages.

* * * * *